US008706461B1

(12) United States Patent
Cary et al.

(10) Patent No.: US 8,706,461 B1
(45) Date of Patent: Apr. 22, 2014

(54) MODELING PROPULSION-RELATED INTERFACES IN COMPUTATIONAL FLUID DYNAMICS

(75) Inventors: Andrew Wham Cary, St. Charles, MO (US); Andrew James Dorgan, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 368 days.

(21) Appl. No.: 13/245,014

(22) Filed: Sep. 26, 2011

(51) Int. Cl.
*G06G 7/50* (2006.01)
*G06G 7/48* (2006.01)

(52) U.S. Cl.
USPC .................................. 703/9; 703/6

(58) Field of Classification Search
USPC .......................................... 703/6, 9
See application file for complete search history.

(56) References Cited

U.S. PATENT DOCUMENTS

| 8,457,938 B2* | 6/2013 | Archibald et al. ................ 703/9 |
| 2009/0063116 A1* | 3/2009 | Ramsay et al. ................... 703/8 |
| 2009/0150133 A1* | 6/2009 | Archibald et al. ................ 703/9 |
| 2012/0158387 A1* | 6/2012 | VanGilder et al. ................ 703/9 |
| 2012/0303344 A1* | 11/2012 | Cruz ................................ 703/9 |

OTHER PUBLICATIONS

Bush, R.H., "Engine Face and Screen Loss Models for CFD Applications," AIAA 1997-2076, 1997.
Chuiton, F.L., "Actuator Disc Modeling for Helipcopter Rotors," Aerospace Science and Technology, vol. 8, pp. 285-297, 2004.
Kim, S., et al., "Three-Dimensional Flow Calculation Around/Through isolated Nacelle with an Actuator Disk Modeling," AIAA 99-2688, 1999.
Whitfield, D.L., et al., "Three-Dimensional Euler Equation Simulation of Propeller-Wing Interaction in Transonic Flow," AIAA 83-0236, 1983.

\* cited by examiner

*Primary Examiner* — David Silver
(74) *Attorney, Agent, or Firm* — Hope Baldauff, LLC (57) ABSTRACT

Concepts and technologies are disclosed herein for modeling propulsion-related interfaces in computational fluid dynamics ("CFD"). According to some embodiments disclosed herein, a model is obtained or developed and propulsion-related interfaces within the model are identified. Flow directions of velocities, temperature, and/or mass are calculated adjacent to the propulsion-related interface and compared. A mass flow rate, a conserved variable state jump, a change in flux across the interface, and/or incoming and outgoing flux values can be calculated for the propulsion-related interface. The calculated values can be returned and embedded in the model. The model is solved and a solution is output.

9 Claims, 4 Drawing Sheets

MODELING PROPULSION-RELATED INTERFACES IN COMPUTATIONAL FLUID DYNAMICS

TECHNICAL FIELD

The present disclosure relates generally to computational fluid dynamics and, more particularly, to modeling propulsion-related interfaces in computational fluid dynamics.

BACKGROUND

Computational fluid dynamics ("CFD") is an approach to solving fluid flow problems by solving models that include numerical methods and algorithms used to represent fluids. The methods and/or algorithms are generally solved by computers. The solution of the models can provide a simulation of an interaction of fluids with a structure defined by surfaces, each of which can be defined by boundary conditions within the model. The results, or solution, can be used to validate and/or improve designs, for example.

In CFD, complex surfaces and interactions can require extensive computing resources. Thus, an increasing level of computer capabilities has provided a corresponding increase in the ability to model complex geometries of various systems and devices. As a result of the continually increasing computer capabilities, new and improved boundary conditions within a CFD code are being generated to address more detail associated with simulated surfaces. Notwithstanding these increasing capabilities, some surfaces or structures are approximated in the model due to extremely complex interactions between the surfaces and fluids and/or for other reasons.

Propulsion-related interfaces, for example, can require complex modeling algorithms and methods due not only to complex geometry, but also because effects of the propulsion-related interfaces on the surrounding fluid can be extensive and/or complex as well. Because of this complexity, some CFD approaches include modeling propulsion-related interfaces by inducing macroscopic effects on the flowfield on either side of the propulsion-related interfaces. Thus, for example, flow toward a propulsion-related interface and flow away from the interface can be represented in a model.

In some instances, a discontinuous jump is imposed at the propulsion-related interface to model the flow properties at either side of the interface. In this approach, effects of the propulsion-related interface are modeled, but the device itself is not. Because these jumps are imposed on the solution quantities across the boundary, these models sometimes violate conservation of mass, and/or other real-world conditions. These and other results of the jumps can negatively impact the results of the simulation.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the embodiments disclosed herein, a computer implemented method for modeling a propulsion-related interface is presented. The method includes computer-implemented operations for receiving a model including mathematical expressions for representing a structure having the propulsion-related interface, solving a portion of the model to compute values associated with the propulsion-related interface, embedding the values in the model, and solving the model to compute a solution associated with the model.

According to another aspect of the embodiments disclosed herein, a computer implemented method for modeling a propulsion-related interface is presented. The method includes computer-implemented operations for receiving, at a modeling system, a model including mathematical expressions for representing a structure having the propulsion-related interface, calculating values for conditions adjacent to the propulsion-related interface, and determining if flow directions associated with the values are oriented in a same flow direction. The method also includes in response to determining that the flow directions associated with the values are oriented in the same flow direction, computing a mass flow rate at the propulsion-related interface, computing a jump in conserved variable state associated with the propulsion-related interface based, at least partially, upon the mass flow rate, and computing a jump in flux across the propulsion-related interface. The method also includes in response to determining that the flow directions associated with the values are not oriented in the same flow direction, indicating no losses across the propulsion-related interface. The method also includes embedding the values in the model and solving the model to compute a solution associated with the model.

According to yet another aspect of the embodiments disclosed herein, a computer implemented method for modeling a propulsion-related interface is presented. The method includes computer-implemented operations for receiving, at a modeling system, a model including a first plurality of mathematical expressions for representing a structure having the propulsion-related interface and a second plurality of mathematical expressions for representing a fluid. The method also includes calculating values for conditions adjacent to a surface of the propulsion-related interface and determining if one or more flow directions associated with the values are oriented in a same flow direction. The method includes, in some embodiments, in response to determining that the one or more flow directions associated with the values are oriented in the same flow direction, computing a mass flow rate of the fluid at the propulsion-related interface, computing a jump in conserved variable state associated with the fluid at the propulsion-related interface based, at least partially, upon the mass flow rate, and computing a jump in flux across the propulsion-related interface. The method also can include in response to determining that the flow directions associated with the values are not oriented in the same flow direction, indicating no losses across the propulsion-related interface. According to various implementations, the method also includes calculating an outbound flux (out from fluid volume) and calculating an inbound flux (into the fluid volume, downstream of the propulsion-related interface) including a sum of the outbound flux value and a value calculated for the jump in flux. The method also can include embedding at least one of the inbound flux value or the outbound flux value in the model and solving the model to compute a solution associated with the model.

The features, functions, and advantages discussed herein can be achieved independently in various embodiments of the concepts and technologies disclosed herein, or may be combined in yet other embodiments, further details of which can be seen with reference to the following description and drawings.

DETAILED DESCRIPTION

The following detailed description is directed to modeling propulsion-related interfaces in computational fluid dynamics ("CFD"). According to the concepts and technologies disclosed herein, a model is received, developed, retrieved, or otherwise obtained at a modeling system. The model can include various mathematical expressions and/or algorithms for describing a simulated structure and fluid environment. According to various embodiments, the modeled structure corresponds to a vehicle such as an aircraft, and the model includes one or more propulsion-related interfaces such as, for example, an actuator disk, a heat exchanger, a screen, and/or other devices or structures.

According to some implementations, the modeling system executes a modeling tool for solving the model. The modeling tool is configured to identify one more propulsion-related interfaces in the model and to solve a portion of the model to determine conditions associated with the propulsion-related interfaces. During solving of the portion of the model to determine the conditions associated with the propulsion-related interfaces, the modeling tool calculates values adjacent to the propulsion-related interfaces. For purposes of this disclosure, "adjacent to the propulsion related interfaces" refers to a "spatial" relation in the modeled environment and not, necessarily, to a relationship between two or more algorithms or mathematical expressions. Thus, the modeling tool can solve conditions of the modeled environment adjacent to the modeled propulsion-related interface.

In solving the conditions associated with the propulsion-related interfaces, the modeling tool can determine if flow directions of the fluid at the propulsion-related interface are consistent with one another. "Consistent" flow directions, as used herein, can include flow directions that are the same or identical, as well as flow directions that are substantially similar to one another, for example, flow directions that are flowing generally toward or generally away from a propulsion-related interface, whether or not a direction of the flow directions is identical. If the flow directions are consistent, the modeling tool can calculate various values associated with the propulsion-related interfaces including, but not necessarily limited to, a mass flow rate, a jump in conserved variable state, and a flux jump across the interface. If the flow direction is not consistent, the modeling tool can indicate that no losses are experienced at the propulsion-related interface.

In either event, the modeling tool can be configured to compute flux values for the incoming side of the propulsion-related interface and the outbound side of the propulsion-related interface. The computed values can be embedded in the model and the model can be solved. A solution for the model as modified during the solving of conditions associated with the propulsion-related interface can be output by the modeling tool and illustrated by the modeling tool and/or other application programs. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

Figure 1:
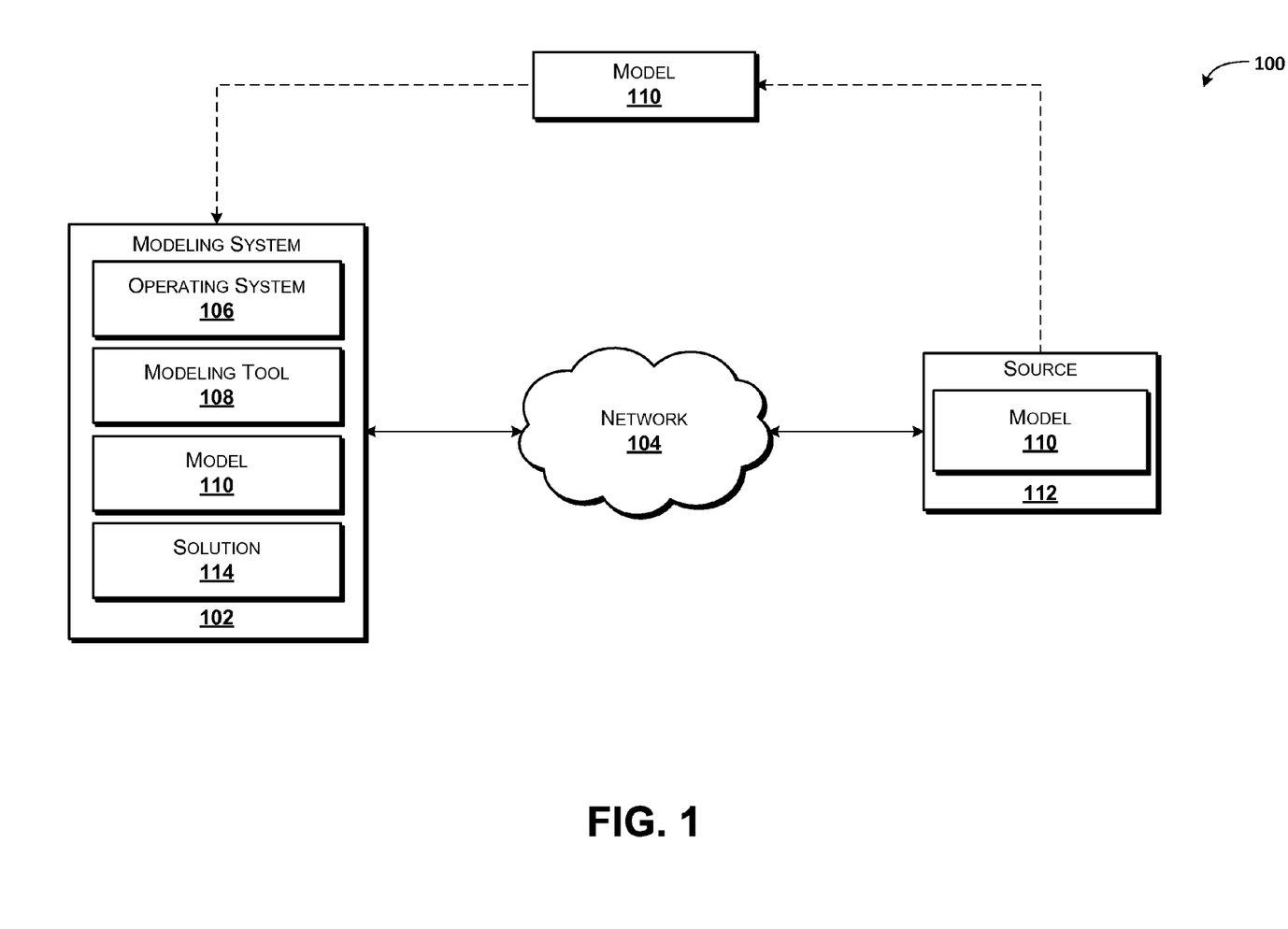
FIG. 1 is a system diagram illustrating an illustrative operating environment for the various embodiments disclosed herein.

Referring now to FIG. 1, aspects of one operating environment 100 for the various embodiments presented herein will be described. The operating environment 100 shown in FIG. 1 includes a modeling system 102. In some embodiments, the modeling system 102 operates on or in communication with a communications network ("network") 104, though this is not necessarily the case. According to various embodiments, the functionality of the modeling system 102 is provided by one or more computing devices such as, for example, a personal computer ("PC") such as a desktop, tablet, or laptop computer system; a server computer; an embedded computer system; and/or other types of computing systems. While the functionality of the modeling system 102 is described herein as being provided by computer such as a PC or laptop computer, it should be understood that this embodiment is illustrative, and should not be construed as being limiting in any way.

According to various embodiments, the modeling system 102 is configured to execute an operating system 106 and one or more application programs such as, for example, a model development and solver tool ("modeling tool") 108 and/or other application programs. The operating system 106 is a computer program for controlling the operation of the modeling system 102. The modeling tool 108 is an executable program configured to execute on top of the operating system 106 to provide the functionality described herein for modeling propulsion-related interfaces in CFD.

The modeling tool 108 is configured to provide functionality for developing, receiving, and/or storing a model 110. In some embodiments, the model 110 is developed and/or stored at the modeling system 102. The model 110 can be stored in a memory or other suitable data storage component of the modeling system 102. The model 110 also can be stored at a data storage device associated with the modeling system 102 and/or in communication with the modeling system 102 such as, for example, a network hard drive, a remote server, a virtual storage device, combinations thereof, or the like.

In other embodiments, the model 110 can be developed, created, authored, and/or otherwise obtained at the modeling system 102. For example, in some embodiments a user such as, for example, a CFD engineer or other entity, can interact with the modeling tool 108 to develop the model 110. In some embodiments, the model 110 is created at the modeling system 102 or another device in communication with the modeling system 102 and transmitted to, or stored at, the modeling system 102.

In yet other embodiments, the model 110 is received, retrieved, and/or otherwise obtained from a source 112 that is operating on or in communication with the network 104 and/or in communication with the modeling system 102. According to various implementations, the source 112 can be a network hard drive, a server computer operating on the network 104 or in communication therewith, a developer website or device, a datastore such as a database, a model development service, and/or any other suitable device, entity, or combination thereof. While FIG. 1 illustrates a model 110 stored at the source 112, it should be understood that the source 112 can be omitted. Furthermore, because the model 110 can be obtained from a variety of sources, can be created at a variety of devices or systems, and/or can be obtained at the modeling system 102 any number of ways, it should be understood that the illustrated embodiments are illustrative, and should not be construed as being limiting in any way.

The model 110 includes computer code that represents and/or corresponds to one or more mathematical models. The mathematical models can be used to mathematically describe a modeled structure, device, and/or fluid environment surrounding the device. In one illustrative embodiment, the model 110 includes mathematical models corresponding to a vehicle such as an aircraft and a fluid operating environment such as air. It should be further appreciated that the model 110 can specify temperatures, velocities, and/or other aspects of the fluid environment surrounding the modeled structure. As is understood, the fluid can be modeled on a mesh or grid. These and other basic concepts of modeling in CFD are not described herein in additional detail for the sake of brevity.

Thus, in various implementations of the concepts and technologies disclosed herein, the model 110 includes mathematical expressions defining the geometry of a simulated device, a fluid surrounding the simulated device in the modeled environment, velocities, temperatures, and/or other aspects of the device and/or the mesh, and boundary conditions defining fluid boundaries, initial conditions in transient environments, and the like. The modeling tool 108 is configured to load the model 110, to start a simulation, and to iteratively solve the equations corresponding to the model 110 to develop a solution 114. As is generally understood, the solution 114 generated by the modeling tool 108 corresponds to a mathematical representation of how the fluid reacts to the various structures of the modeled device as defined by the model 110.

In various embodiments, the modeling tool 108 also is configured to provide visualization of the solution 114. For example, the modeling tool 108 can be configured, in various embodiments, to output the results from the simulation as the solution 114 in a visual format. In other embodiments, the modeling tool 108 outputs the solution 114 to a visualization engine (not illustrated) that is configured to render or otherwise illustrate the solution 114. Thus, the modeling tool 108 or other software module can be configured to provide visualization of the solution 114, if desired.

According to various embodiments of the concepts and technologies disclosed herein, the model 110 includes mathematical expressions corresponding to one or more propulsion-related interfaces such as actuator disks, heat exchangers, screens, and the like. Embodiments of the modeling tool 108 disclosed herein includes functionality for implementing a numerical flux scheme for resolving imposed discontinuities at propulsion-related interfaces represented within the model 110. These and other aspects of the modeling tool 108 are described in more detail below, particularly with reference to FIGS. 2-3.

As is generally known, traditional attempts at solving models that include propulsion-related interfaces in CFD entail representing the propulsion-related interfaces with various expressions that impose velocity, temperature, mass flow, flux, and/or other "jumps," or value changes, at or around the propulsion-related interfaces. These jumps are imposed in an attempt to capture effects of the propulsion-related interfaces without generating and/or solving complex models associated with the propulsion-related interfaces. As is known, however, such imposed jumps can affect the realism of the models by introducing mass and energy conservation issues in the models and/or solutions.

Embodiments of the modeling tool 108 described herein, however, are configured to analyze the mathematical expressions corresponding to the propulsion-related interfaces, to analyze flows around the propulsion-related interfaces, to calculate flux and variable state jumps at or around the propulsion-related interfaces, to calculate or compute inbound and outbound flux values, and to return and embed the computed inbound flux and computed outbound flux in the model 110 so that solutions of the model 110 include calculated effects of the propulsion-related interfaces. As used herein, "flux" can refer to energy, mass, and/or momentum. The model 110 including the embedded values can be solved by the modeling tool 108, thereby providing a solution 114 of a model 110 that satisfies mass conservation, and therefore more closely approximates the real world than other approaches that violate mass conservation principles. The functionality of the modeling tool 108 for implementing the numerical flux scheme are described in more detail herein with reference to FIGS. 2-3.

While the functionality of the modeling tool 108 is described herein as being provided by one application program, it should be understood that the model development and model solving functionalities described herein can be provided by two or more application programs. Similarly, FIG. 1 illustrates one modeling system 102, one network 104, and one source 112. It should be understood, however, that some implementations of the operating environment 100 include modeling systems 102, multiple networks 104, and zero or multiple sources 112. Thus, the illustrated embodiments should be understood as being illustrative, and should not be construed as being limiting in any way.

Figure 2:
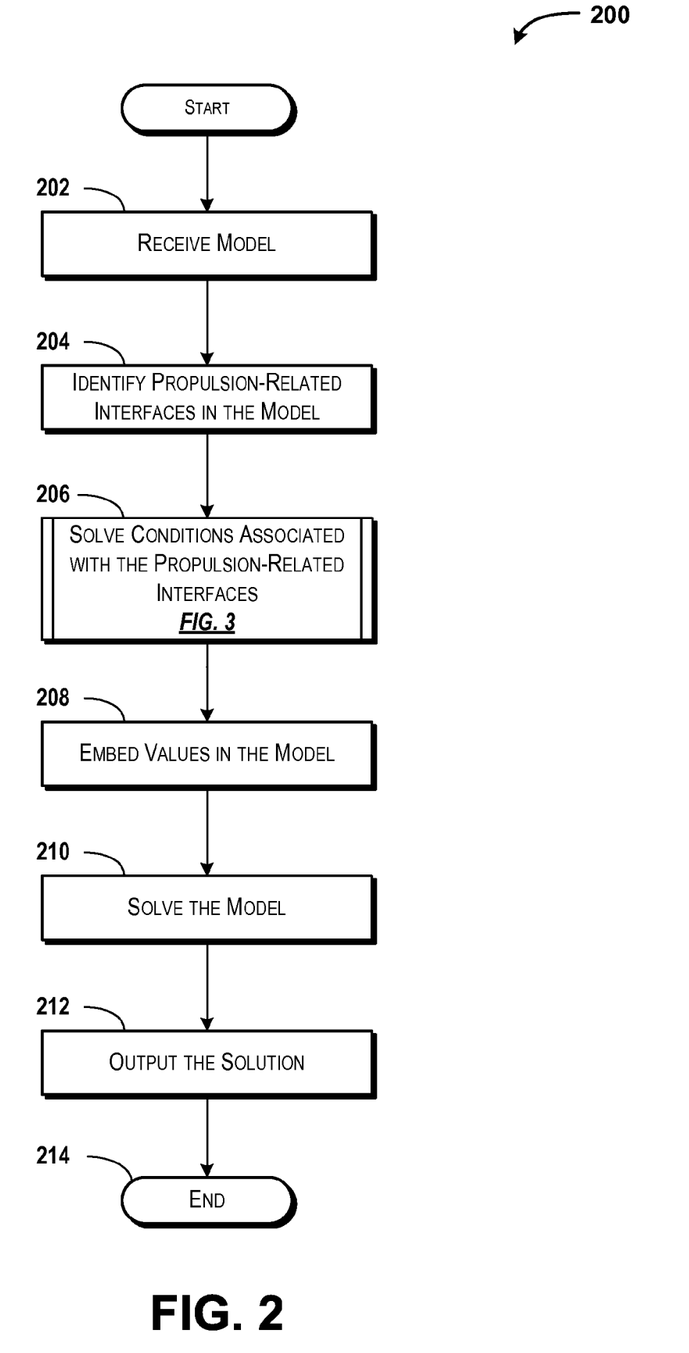
FIG. 2 is a flow diagram showing aspects of a method for solving a model including a propulsion-related interface in CFD, according to an illustrative embodiment.

Turning now to FIG. 2, aspects of a method 200 for solving a model 110 including a propulsion-related interface will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the modeling system 102 via execution of the modeling tool 108. It should be understood that these embodiments are illustrative, and should not be viewed as being limiting in any way. In particular, it should be understood that any suitable device can be configured to provide the functionality disclosed herein via execution of any suitable program or module.

The method 200 begins at operation 202, wherein the modeling tool 108 receives a model 110. The model 110 can be received from a remote system, device, or data storage location such as, for example, the source 112 or any other location. The model 110 also can be received or retrieved from a local data storage device or location such as a memory, a hard disk drive, or another data storage device. The model 110 also can be developed or created at the modeling system 102 using the modeling tool 108 or other application programs executed at the modeling system 102. Thus, it should be understood that the model 110 can be retrieved, received, or otherwise obtained by the modeling system 102 in any manner from any location.

From operation 202, the method 200 proceeds to operation 204, wherein the modeling tool 108 identifies one or more propulsion-related interfaces in the model 110. As explained above with reference to FIG. 1, the model 110 includes, in various embodiments, mathematical expressions corresponding to one or more modeled devices and a modeled operating environment. According to various implementations, the model 110 includes one or more mathematical expressions that correspond to one or more propulsion-related interfaces such as an actuator disk, a heat exchanger, a screen, or other propulsion-related interfaces. The modeling tool 108 can be configured to recognize the modeled propulsion-related interfaces within the model 110, or to receive input from a user indicating the presence of propulsion-related interfaces in the model 110.

Thus, operation 204 can include searching the model 110 for expressions associated with propulsion-related interfaces. The expressions associated with propulsion-related interfaces can be recognized by mathematical structure and/or by other means. The operation 204 also can include receiving input from a user or other entity. Because the propulsion-related interfaces can be identified in other ways, it should be understood that these embodiments are illustrative, and should not be construed as being limiting in any way.

From operation 204, the method 200 proceeds to operation 206, wherein the modeling tool 108 solves conditions associated with the propulsion-related interfaces. In various implementations, the modeling tool 108 applies a numerical flux scheme to the model 108 to solve the conditions associated with the propulsion-related interfaces, thought this is not necessarily the case. Aspects of one illustrative process for solving conditions associated with the propulsion-related interfaces are illustrated and described below in more detail with reference to FIG. 3. For purposes of illustrating and describing the method 200, however, it should be appreciated that the modeling tool 108 can solve a portion of the model 110 corresponding to an area adjacent to a propulsion-related interface, calculate values associated with the propulsion-related interface, and return the calculated values in operation 206.

From operation 206, the method 200 proceeds to operation 208, wherein the modeling tool 108 embeds the values calculated in operation 206 in the model 110. As will be explained in more detail below with reference to FIG. 3, the values returned in operation 206 correspond, in some embodiments, to an incoming flux value relative to the propulsion-related interface, an outgoing flux value relative to the propulsion-related interface, a change in flux across the propulsion-related interface, and/or a change in variable state at or across the propulsion-related interface. Thus, in operation 208, the modeling tool 108 can embed one or more of these and/or other values in the model 110.

From operation 208, the method 200 proceeds to operation 210, wherein the modeling tool 108 solves the model 110. It can be appreciated that the model 110 solved in operation 210 can differ from the model 110 received or otherwise obtained in operation 202. For example, the model 110 solved by the modeling tool 108 in operation 210 can include the embedded values discussed above with reference to operations 206-208, though this is not necessarily the case. As explained above with reference to FIG. 1, the modeling tool 108 can calculate a solution 114 that corresponds to a calculated solution for the model 110.

From operation 210, the method 200 proceeds to operation 212, wherein the modeling tool 108 outputs the solution 114 determined or calculated in operation 210. As mentioned above with reference to FIG. 1, the solution 114 output in operation 212 can be passed to a visualization engine, if desired, and/or otherwise visually output for a user or other entity, though this is not necessarily the case. From operation 212, the method 200 proceeds to operation 214. The method 200 ends at operation 214.

Figure 3:
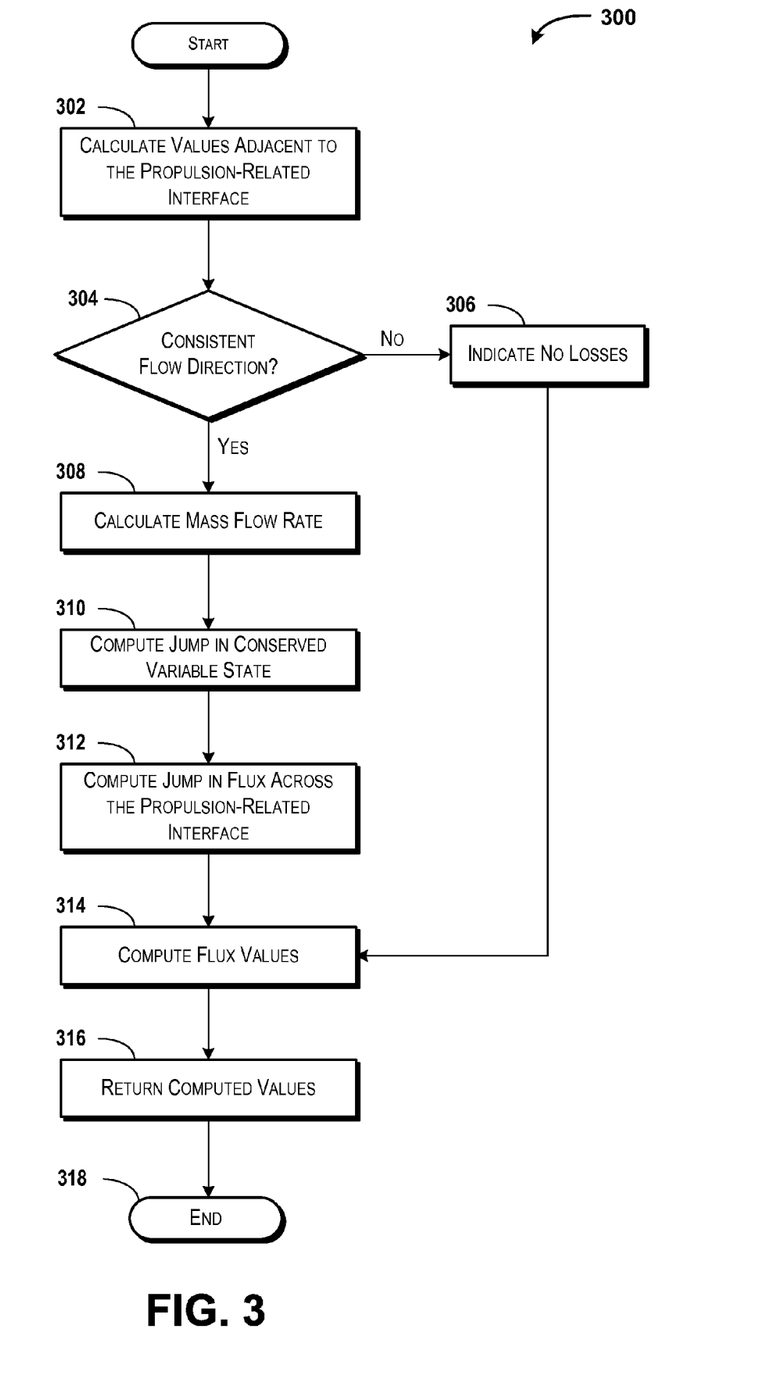
FIG. 3 is a flow diagram showing aspects of a method for modeling a propulsion-related interface in CFD, according to an illustrative embodiment.

Turning now to FIG. 3, aspects of a method 300 for solving conditions associated with propulsion-related interfaces will be described in detail. Although not explicitly shown in FIG. 3, it should be understood that the operations of the method 300 can be repeated for each propulsion-related interface identified in the model 110. Furthermore, as noted above with reference to FIG. 2, the operations described herein with reference to FIG. 3 can correspond to the solving of propulsion-related interface conditions at operation 206 of the method 200 illustrated and described above with reference to FIG. 2, though this is not necessarily the case.

The method 300 begins at operation 302, wherein the modeling tool 108 calculates values adjacent to the propulsion-related interface. In some embodiments, the modeling tool 108 solves the interior of the mesh. As used herein, the "interior of the mesh" refers to a portion of the mesh adjacent to the propulsion-related interface being considered in the method 300. In various implementations, the functionality associated with operation 302 is provided by the modeling tool 108 by computing a CFD solution for a portion of the model 110 corresponding to the interior of the mesh. This partial solution corresponding to the values adjacent to the propulsion-related interface can be analyzed by the modeling tool 108 to determine flow directions, and the like, as is explained in more detail below.

From operation 302, the method 300 proceeds to operation 304, wherein the modeling tool 108 analyzes the values calculated in operation 302 to determine if the flow directions associated with the values are consistent at or near the propulsion-related interface. As mentioned above, "consistent" flow directions can be flow directions that are identical or the same. "Consistent" flow directions also can be flow directions that are substantially similar such as flow directions that are oriented generally in the same direction, even if the actual directions are not identical.

In some implementations, the modeling tool 108 determines if flow directions of the values calculated in operation 302 are oriented in the same direction with respect to the face of the propulsion-related interface. In response to this determination, the modeling tool 108 can determine that the values calculated in operation 302 have a consistent flow direction if the flow directions are oriented in the same direction, or that the values do not have a consistent flow direction the values have flow directions that are not the same or similar with respect to a face of the propulsion-related interface. Because the modeling tool 108 can determine if the flow directions are consistent via other processes, these embodiments should be understood as being illustrative, and should not be construed as being limited in any way.

If the modeling tool 108 determines, in operation 304, that the values calculated in operation 302 are oriented in a consistent flow direction, the method 300 proceeds to operation 306. At operation 306, the modeling tool 108 can indicate that no losses are experienced at, through, or because of the propulsion-related interface. As such, the modeling tool 108 can set a change in flux, $\Delta F$ and a change in conserved variable state, $\Delta q$ as being equal to zero (and each other). The modeling tool 108 can be configured to solve the remainder of the model 110 without modifying the conditions associated with the propulsion-related interface, thus allowing the modeling tool 108 to resolve the inconsistency during solving of the model 110. From operation 306, the method 300 proceeds to operation 314, which is described in more detail below.

If the modeling tool 108 determines, in operation 304, that the values calculated in operation 302 are oriented in a consistent flow direction, the method 300 proceeds to operation 308. In operation 308, the modeling tool 108 calculates a mass flow rate (indicated herein as $\dot{m}$) associated with the propulsion-related interface. It can be appreciated that the mass flow rate can be determined for any state associated with the propulsion-related interface, as the mass flow rate can be assumed to be consistent at the convergence at the propulsion-related interface. As such, the modeling tool 108 can be configured to calculate the mass flow rate for any state. The choice as to which state to use to calculate the mass flow rate associated with the propulsion-related interface therefore can be arbitrary.

According to some implementations, the modeling tool 108 calculates the mass flow rate, $\dot{m}$, for the inbound flow side, or inbound side, of the model 110. For example, the modeling tool 108 can be configured to calculate the mass flow rate, $\dot{m}$, as being substantially equal to $\rho u_L$. It should be understood that this embodiment is illustrative, and should not be construed as being limiting in any way. In other implementations, the modeling tool 108 calculates the mass flow rate, $\dot{m}$, for the outbound flow side of the model 110. For example, the modeling tool 108 can be configured to calculate the mass flow rate, $\dot{m}$, as being substantially equal to $\rho u_R$. It should be understood that this embodiment is illustrative, and should not be construed as being limiting in any way. In yet other embodiments, the modeling tool 108 calculates the mass flow rate, $\dot{m}$, as one half of the sum of the inbound flow rate plus the outbound flow rate. For example, the modeling tool 108 can be configured to calculate the mass flow rate, $\dot{m}$, as being substantially equal to $\frac{1}{2}[\rho u_R + \rho u_R]$. Because the mass flow rate, $\dot{m}$, may be calculated in other ways, it should be understood that these embodiments are illustrative, and should not be construed as being limiting in any way.

From operation 308, the method 300 proceeds to operation 310, wherein the modeling tool 108 computes a jump in the conserved variable state, $\Delta q$, based upon the calculated flow rate $\dot{m}$ and one or more user parameters. According to some embodiments, the modeling tool 108 calculates $\Delta q$ as being substantially equal to $$\begin{pmatrix} \Delta \rho \\ \Delta(\rho \vec{V}) \\ \Delta \rho e_0 \end{pmatrix} = \begin{pmatrix} \Delta \rho \\ \rho_L \Delta \vec{V} + (\vec{V}_L + \Delta \vec{V}) \Delta \rho \\ \rho_L \Delta e_0 + (e_{0L} + \Delta e_L) \Delta \rho \end{pmatrix}.$$

Some illustrative user parameters are discussed in more detail below. It should be understood that this embodiment is illustrative, and should not be construed as being limiting in any way.

From operation 310, the method 300 proceeds to operation 312, wherein the modeling tool computes a jump in flux, $\Delta F$, across the propulsion-related interface. According to some embodiments, the modeling tool 108 calculates $\Delta F$ as being substantially equal to $$\begin{pmatrix} \Delta \dot{m} \\ \vec{V}_L \Delta \dot{m} + (\dot{m}_L + \Delta \dot{m}) \Delta \vec{V} + \Delta \rho \hat{n} \\ H_L \Delta \dot{m} + (\dot{m}_L + \Delta \dot{m}) \Delta H \end{pmatrix}.$$

wherein the total enthalpy, H, can be represented as $$H = c_p T + \frac{1}{2} \vec{V} \cdot \vec{V},$$

and wherein the jump in enthalpy, $$\Delta H = c_p \Delta T + \frac{1}{2} \vec{V} \cdot \vec{V} = c_p \Delta T + \vec{V}_L \cdot \Delta \vec{V} + \frac{1}{2} \Delta \vec{V} \cdot \vec{V}.$$

It thus can be appreciated that the jump in flux, $\Delta F$, can be based, at least partially, upon the mass flow rate, $\dot{m}$, calculated in operation 308. It should be understood that this embodiment is illustrative, and should not be construed as being limiting in any way.

From operations 312 and 306, the method 300 proceeds to operation 314, wherein the modeling tool 108 computes one or more flux values for the propulsion-related interface based, at least partially, upon the jump in flux, $\Delta F$, calculated in operation 312. In some embodiments, the modeling tool 108 calculates the flux associated with the outbound flow side of the model 110, F*, and the flux associated with the incoming flow side of the model 110, F*+$\Delta F$. In some embodiments, the modeling tool 108 calculates the outgoing flux as $$F^* = \frac{b^+ F_L - b^- F_R}{b^+ - b^-} + \frac{b^+ + b^-}{b^+ - b^-}(q_R - q_L) + \frac{b^-}{b^+ - b^-} \Delta F - \frac{b^+ b^-}{b^+ - b^-} \Delta q,$$

wherein $b^-$, $b^+$ denote signal velocities. The modeling tool 108 can calculate the incoming flux as F*+$\Delta F$, both of which are shown above. It should be understood that this embodiment is illustrative, and should not be construed as being limiting in any way.

From operation 314, the method 300 proceeds to operation 316, wherein the modeling tool 108 returns the computed values. As explained above with regard to FIG. 2, the returned values can be embedded in the model 110 by the modeling tool 108 and the model 110 can be solved. In some embodiments, the calculated outgoing flux, F*, can be applied to the left cell and the incoming flux, F*+ΔF, can be applied to the right cell. The outgoing flux and the incoming flux can be represented, respectively, as $$F^* = \frac{1}{b^+ - b^-}[b^+ F_L - b^-(F_R - \Delta F) + b^+ b^-((q_R - \Delta q) - q_L)] \text{ and } F^* + \Delta F =$$

$$\frac{1}{b^+ - b^-}[b^+(F_L + \Delta F) - b^- F_R + b^+ b^-(q_R - (q_L + \Delta q))].$$

While the above equations are based upon the HLL flux formulation, it should be understood that this embodiment is illustrative, and should not be construed as being limiting in any way. It further should be understood that the concepts and technologies disclosed herein are not limited to the HLL family of equations, and that other numerical flux functions can be used without departing from the scope of the concepts and technologies disclosed herein.

From operation 316, the method 300 proceeds to operation 318. The method 300 ends at operation 318.

In some implementations, values assigned in the model 110 for a jump in mass flow $\Delta \dot{m}$, a jump in pressure $\Delta p$, a jump in temperature $\Delta T$, and a jump in velocity $\Delta V_p$ can be model-dependent and/or can be selected based upon the type of propulsion-related interface being modeled and/or considered. Thus, these and other values can be input as user parameters or by model-based settings or options. As such, the various jump values can be defined in a manner that the jumps are consistent with the type of device modeled within the model 110. These values can correspond to values induced or realized due to the propulsion-related interface. Some illustrative examples for the model-dependent propulsion-related interface values $\Delta \dot{m}$, $\Delta p$, $\Delta T$, and $\Delta V_p$ are described in detail below.

In some embodiments, for example, the propulsion-related interface corresponds to a heat exchanger. Because a heat exchanger does not allow for creation or destruction of mass, the value assigned for $\Delta \dot{m}$ is 0. A heat-exchanger coefficient, $C_{HX}$ and a local mass flux exponent, n, can be assumed to be user-specified parameters. Based upon these parameters, the jump in pressure induced by a heat exchanger is computed as $\Delta p = G_{HX} \dot{m}^n$. This value can be applied as a loss across the boundary. Similarly, a change in temperature across the heat exchanger, $\Delta T$, is specified as a static temperature increase by the user. The velocity jump can be expressed as $\Delta \vec{V} = \Delta V_n \hat{n} + \Delta \vec{V}_p$. It should be understood that this embodiment is illustrative, and should not be construed as being limiting in any way.

In other embodiments, the propulsion-related interface corresponds to a screen. Assuming the screen is a choked screen, the choked mass flux $$\dot{m}_{choked} = \left(\frac{\gamma}{RT_T}\right)^{1/2} pt1 \left(\frac{\gamma+1}{2}\right)^{\frac{-\gamma-1}{2(\gamma-1)}}.$$

If $\dot{m}_1 > \dot{m}_{choked}$, the screen is choked. If the screen is choked, the throat Mach number is known ($M_2=1$) and the throat pressure $p_{2,choked}$ can be solved as $$p_{t1}\left(\frac{\gamma+1}{2}\right)^{-\gamma/\gamma-1}.$$

If the screen is not choked, the throat conditions can be determined iteratively, if desired. In some embodiments, the modeling tool 108 chooses a value for $M_2$, solves for $p_2$, solves for $\dot{m}_2$, and compares the value solved for $\dot{m}_2$ to the desired mass flux $\dot{m}_1$. It should be understood that this embodiment is illustrative, and should not be construed as being limiting in any way.

To find the values at the downstream state relative to the screen, a quadratic equation $M_3^2$ can be provided with a solution of $$M_3^2 = \frac{1 - c\gamma - \sqrt{1 - c(\gamma+1)}}{c\gamma^2 - \gamma + 1},$$

$$c = 2\left(\frac{\phi[M_2](1-s)M_2}{1+\phi[M_2](1-s)\gamma M_2^2}\right)^2 \left(1 + \frac{\gamma-1}{2}M_2^2\right),$$

where $\phi[M]$ represents a contraction area ratio. After determining the downstream Mach number, the remaining unknown, $p_3$, can be determined as $$p_3 = \frac{p_2(1 + \phi[M_2](1-s)\gamma M_2^2)^{1/2}}{1 + \gamma M_3^2}.$$

The normal velocity at the downstream state can be set based on conservation of mass such that $$V_{n2} = \frac{\rho_1 V_{n1}}{\rho_2}.$$

The parallel velocity can be set to zero, so the downstream velocity vector can be expressed as $\vec{V}_3 = V_{n3}\hat{n}$. Based upon the above, the jumps for pressure, temperature, and velocity can thus be expressed as $\Delta p = p_3 - p_1$, $\Delta T = T_3 - T_1$, and $\Delta \vec{V} = \vec{V}_3 - \vec{V}_1$. The jump in flux can be expressed as $$\Delta \hat{F}_{screen} = \begin{pmatrix} 0 \\ \dot{m}\Delta \vec{V} + \Delta p\hat{n} \\ \dot{m}_1 \Delta H \end{pmatrix}.$$

It should be understood that this embodiment is illustrative, and should not be construed as being limiting in any way.

In some embodiments, the propulsion-related interface corresponds to an actuator disk. The actuator disk can be modeled in a number of ways based upon flow turning, drive efficiency specifications, thermodynamic increment specifications, and/or other considerations. The downstream velocity normal to the actuator disk can be represented, based upon mass flux conservation, as $$V_{n2} = \frac{\rho_1 V_{n1}}{\rho_2}$$

such that turning of the velocity vector can be accomplished by scaling the parallel velocity component. In some embodiments, a conserve flow angle mode is used to conserve the flow angle from the upstream side of the disk boundary, i.e., $$V_{p2} = V_{p1} \sqrt{\frac{\|V_{n2}\|}{\|V_{n1}\|}},$$

where p denotes the disk-parallel direction. In some embodiments, a conserve parallel velocity model is used to transport the upstream parallel velocity component through the boundary, i.e., $V_{p2}=V_{p1}$. In yet other embodiments, a zero parallel velocity model is used to eliminate the parallel velocity component across the disk boundary, i.e., $V_{p2}=0$.

In another embodiment, a specified downstream flow angle model is used to allow a user to specify the downstream flow angle, relative to the downstream normal pointing vector. The first angle $\phi$ can be specified as a rotation about the z-axis from the projection of the surface normal onto the xy-plane and results in the flow angle $$\psi = \arctan\left(\frac{n_y}{n_x}\right) + \phi$$

such that the x and y components of the vector can be given by $b_x=\cos(\psi)$ and $b_y=\sin(\psi)$. A second angle $\theta$ can also be specified and can set a rotation of the vector resulting from the previous step about the y-axis such that the flow direction can be given by $f_x=b_x \cos(\theta)$, $f_y=b_y$, and $f_z=-b_x \sin(\theta)$ and the parallel velocity component can be expressed as $$V_{p2} = \hat{f} \frac{\|V_{n2}\hat{n}\|}{\vec{f} \cdot \hat{n}} - V_{n2}\hat{n}.$$

In still another embodiment, a solid-body or free vortex turning model can be used to relieve a condition that the actuator boundary be in a primary plane. Thus, a second point on the axis of rotation can be specified. If the second point is not specified, the disk can be assumed to be in the principal plane with a largest component of the local surface normal. Assuming two axis points are known, the unit vector aligned with the axis of rotation can be expressed as $$\hat{a} = \frac{\vec{x}_a - \vec{x}_c}{\|\vec{x}_a - \vec{x}_c\|},$$

wherein $\vec{x}_c$ is the first point and $\vec{x}_a$ is the second point. A radius vector can be expressed as $\vec{r}=(\hat{a}\times\Delta\vec{x})\times\hat{a}=\Delta\vec{x}-(\hat{a}\cdot\Delta\vec{x})\hat{a}$, wherein $\Delta\vec{x}=\vec{x}_p-\vec{x}_c$, and wherein $\vec{x}_p$ is a point of interest on the disk boundary. Based on this, the tangential velocity increment for solid body rotation can be computed from $\vec{V}_{p2}=\omega\hat{a}\times\vec{r}$, where $\omega$ is the angular velocity specified by the user in the case of solid-body rotation.

In the free vortex model, a user specifies vortex strength, $$\kappa = \omega_c r_{core}^2 = \frac{\Gamma}{2\pi}$$

where $\omega_c$ is the angular velocity of the solid-body core, $r_{core}$ is the radius of the solid-body core, and $\Gamma$ is the circulation. In some embodiments, the modeling tool 108 calculates a solid-body core radius such that the minimum pressure in the vortex is $0.1\ p_\infty$. A core radius also can be specified in thousandths of a grid unit, if desired. The tangential velocity increment can be computed, given $r_{core}$ and $\kappa$ as $\vec{V}_{p2}=$ $$\begin{cases} \frac{\kappa}{r_{core}^2}\hat{a}\times\vec{r}, & \text{inside the core} \\ \frac{\kappa}{\|\vec{r}\|^2}\hat{a}\times\vec{r}, & \text{outside the core.} \end{cases}$$

It should be understood that the above-described embodiments for velocity turning are illustrative, and should not be construed as being limiting in any way.

With regard to efficiency specifications, user supplied efficiency values can be supplied to specify the thermodynamic jumps across a disk boundary. According to some implementations, a compressor efficiency can be used. In other implementations, a vortex loss efficiency mechanism is used. In this model, a user supplies a maximum loss for the core of the vortex and then the loss is decayed linearly to the edge of the core. In this embodiment, the downstream total pressure can be expressed as $$p_{t2} = p_{t1} - p_{t,min}\left(1 - \min\left(\frac{\|\vec{r}\|}{r_{core}}, 1\right)\right),$$

where $\vec{r}$ is the radius vector and $r_{core}$ is the radius of the solid-body core of the vortex. Again, the solid-body core radius can be computed based upon a desired maximum pressure at centerline by default, but also can be overridden. It should be understood that these embodiments are illustrative, and should not be construed as being limiting in any way.

With regard to thermodynamic increment specifications, some embodiments specify a jump in total pressure across the disk boundary and the downstream velocity is determined. In another embodiment, a jump in static pressure can be specified across disk boundaries such that $p_2=p_1+\Delta p$. Downstream properties can be computed once iteration has converged. In another embodiment, a specified power increment model is used to specify power increments in units of foot-pounds-per-square-foot to set a jump in total temperature. Based upon this model, the downstream temperature can be expressed as $$T_{t2} = T_{t1} + \frac{\Delta\text{Power}}{\rho_1 V_{n1} C_p},$$

based upon applying a constant power increment per unit area across the disk. The downstream total pressure can be determined using the selected efficiency mode.

In other embodiments, a power increment can be based upon the flow turning assuming that all turning is done by an unsteady process. In this mode, a total temperature increment can be expressed as $T_{t2}=T_{t1}+\omega r\|\Delta\vec{V}_p\|$, where $\omega$ is the rotation rate, r is the distance from the axis of rotation and $\Delta\vec{V}_p$ is the parallel velocity increment included across the actuator disk. It should be understood that this embodiment is illustrative, and should not be construed as being limiting in any way.

In some embodiments, a user can specify the flow turning and rotor work independently to account for the presence of a stator. In this case, the user can specify the net change in flow angle across the disk and the power increment can correspond to the turning work done by the rotor. The total temperature in this model can be expressed as $T_{t2}=T_{t1}+\omega r\|\Delta\vec{V}_p\|$. Other embodiments are contemplated and are possible. As such, it should be understood that this embodiment is illustrative, and should not be construed as being limiting in any way.

In various implementations, the concepts and technologies disclosed herein can be used to represent complex features in systems modeled using conservation laws as a discontinuity. The discontinuity is determined by a model of the system and is used to determine a flux discontinuity. These discontinuities can be embodied in the solution of the conservation law by treating the physical interface as an interface in the discrete system and modifying the numerical flux scheme applied across this interface to account for the discontinuities as an additional discontinuous wave. It should be understood that this approach is illustrative, and should not be construed as being limiting in any way.

Figure 4:
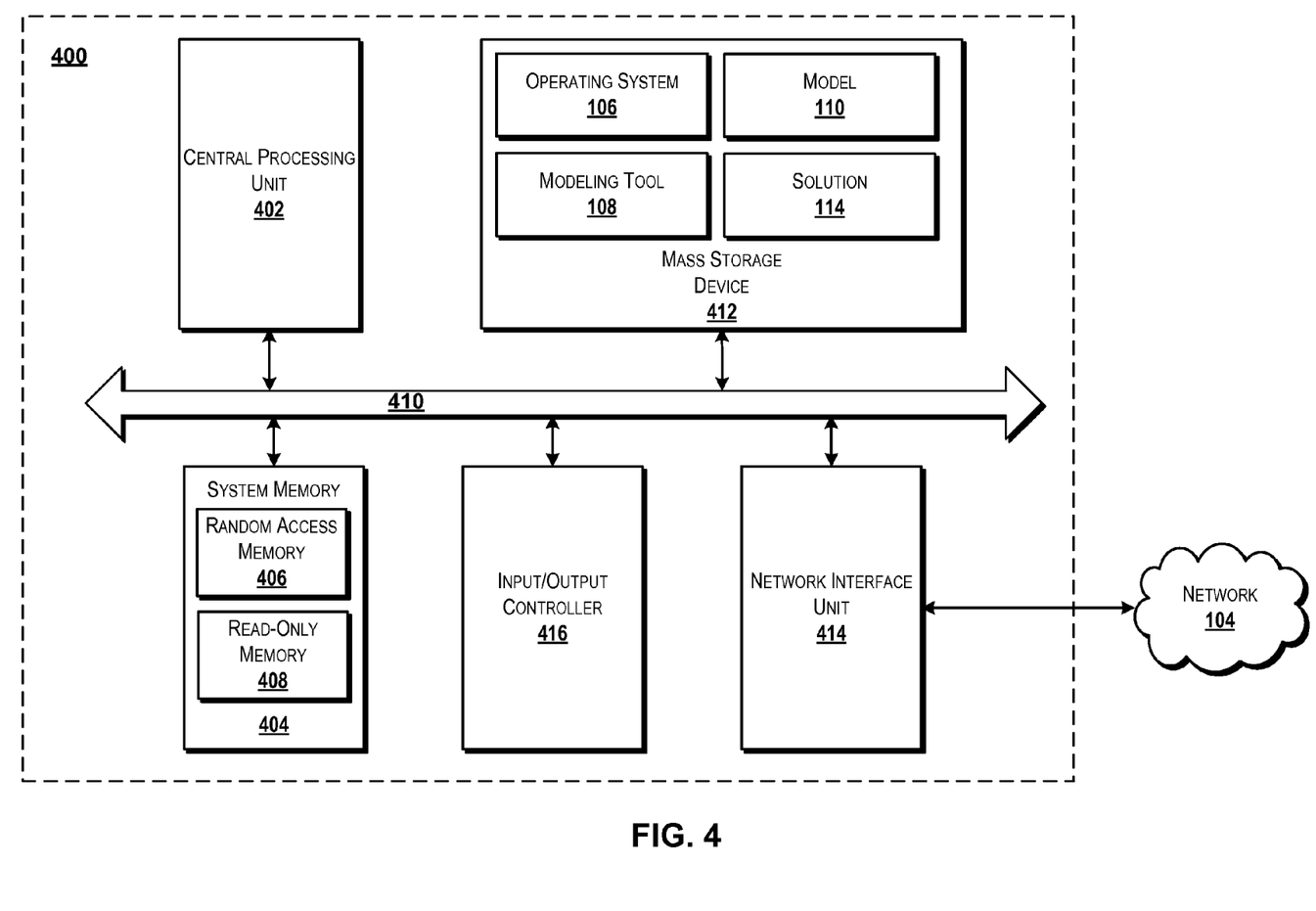
FIG. 4 is a computer architecture diagram illustrating an illustrative computer hardware and software architecture for a computing system capable of implementing aspects of the embodiments presented herein.

FIG. 4 shows an illustrative computer architecture 400 of a modeling system 102 capable of executing the software components described herein for modeling propulsion-related interfaces in CFD as presented herein is shown, according to one embodiment. As explained above, the modeling system 102 may be embodied in a single computing device or in a combination of one or more processing units, storage units, and/or other computing devices. The computer architecture 400 includes one or more central processing units 402 ("CPUs"), a system memory 404 that includes a random access memory 406 ("RAM") and a read-only memory 408 ("ROM"), and a system bus 410 that couples the memory to the CPUs 402.

The CPUs 402 may be standard programmable processors that perform arithmetic and logical operations necessary for the operation of the computer architecture 400. The CPUs 402 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 400 also includes a mass storage device 412. The mass storage device 412 may be connected to the CPUs 402 through a mass storage controller (not shown) further connected to the bus 410. The mass storage device 412 and its associated computer-readable media provide non-volatile storage for the computer architecture 400. The mass storage device 412 may store an operating system 106, the modeling tool 108, and/or other programs or modules configured to execute the various software elements described herein. The mass storage device 412 also may store the model 110, the solution 114, and/or other data.

The computer architecture 400 may store programs and data on the mass storage device 412 by transforming the physical state of the mass storage device to reflect the information being stored. The specific transformation of physical state may depend on various factors, in different implementations of this disclosure. Examples of such factors may include, but are not limited to, the technology used to implement the mass storage device 412, whether the mass storage device is characterized as primary or secondary storage, and the like. For example, the computer architecture 400 may store information to the mass storage device 412 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 400 may further read information from the mass storage device 412 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 400. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. As used herein and in the claims, the phrase "computer storage medium" does not include transitory computer media such as propagated waves or signals, per se.

According to various embodiments, the computer architecture 400 may operate in a networked environment using logical connections to other systems or devices, which may be accessed through a network such as the network 104. The computer architecture 400 may connect to the network 104 through a network interface unit 414 connected to the bus 410. It should be appreciated that the network interface unit 414 may also be utilized to connect to other types of networks and remote computer systems. The computer architecture 400 also may include an input-output controller 416 for receiving input and providing output to various systems and devices such as a display. The input-output controller 416 may receive input from other devices as well, including a keyboard, mouse, electronic stylus, or touch screen associated with the modeling system 102 or other systems or devices. Similarly, the input-output controller 416 may provide output to other displays, a printer, or other type of output device.

Based on the foregoing, it should be appreciated that concepts and technologies for modeling propulsion-related interfaces in CFD are provided herein. Although the subject matter presented herein has been described in language specific to structural features and methodological acts, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer implemented method to model a propulsion-related interface, the method comprising computer-implemented operations for:
   receiving, at a modeling system, a model comprising mathematical expressions for representing a structure comprising the propulsion-related interface;
   calculating values for conditions adjacent to the propulsion-related interface;
   determining if flow directions associated with the values are oriented in a same flow direction;
   in response to determining that the flow directions associated with the values are oriented in the same flow direction, computing a mass flow rate at the propulsion-related interface, computing a jump in conserved variable state associated with the propulsion-related interface based, at least partially, upon the mass flow rate, and computing a jump in flux across the propulsion-related interface based, at least partially, upon the mass flow rate and the jump in conserved variable state;
   in response to determining that the flow directions associated with the values are not oriented in the same flow direction, indicating no losses across the propulsion-related interface;
   embedding the values in the model; and
   solving the model to compute a solution associated with the model.

2. The method of claim 1, wherein further comprising:
   calculating an outbound flux value using a numerical flux function; and
   calculating an inbound flux value, the inbound flux value comprising a sum of the outbound flux value and a value calculated for the jump in flux.

3. The method of claim 2, further comprising outputting the solution.

4. The method of claim 1, wherein the jump in conserved variable state is further based upon at least one user parameter.

5. The method of claim 4, wherein the flow rate is expressed as:
   a flow rate on an inbound side of the propulsion-related interface; or
   one half of a sum of the flow rate on the inbound side of the propulsion-related interface and a flow rate on an outbound side of the propulsion-related interface.

6. A computer implemented method to model a propulsion-related interface, the method comprising computer-implemented operations for:
   receiving, at a modeling system, a model comprising a first plurality of mathematical expressions for representing a structure comprising the propulsion-related interface and a second plurality of mathematical expressions for representing a fluid;
   calculating values for conditions adjacent to a surface of the propulsion-related interface;
   determining if one or more flow directions associated with the values are oriented in a same flow direction;
   in response to determining that the one or more flow directions associated with the values are oriented in the same flow direction, computing a mass flow rate of the fluid at the propulsion-related interface, computing a jump in conserved variable state associated with the fluid at the propulsion-related interface based, at least partially, upon the mass flow rate, and computing a jump in flux across the propulsion-related interface based, at least partially, upon the mass flow rate and the jump in conserved variable state;
   in response to determining that the flow directions associated with the values are not oriented in the same flow direction, indicating no losses across the propulsion-related interface;
   calculating an outbound flux value;
   calculating an inbound flux value comprising a sum of the outbound flux value and a value calculated for the jump in flux;
   embedding at least one of the inbound flux value or the outbound flux value in the model; and
   solving the model to compute a solution associated with the model.

7. The method of claim 6, wherein the jump in conserved variable state is further based upon at least one user parameter.

8. The method of claim 7, wherein the flow rate is expressed as:
   a flow rate on an inbound side of the propulsion-related interface; or
   one half of a sum of the flow rate on the inbound side of the propulsion-related interface and a flow rate on an outbound side of the propulsion-related interface.

9. The method of claim 8, wherein the structure comprises an aircraft and the fluid comprises air.

* * * * *